(12) United States Patent
Kwon et al.

(10) Patent No.: US 11,068,112 B2
(45) Date of Patent: Jul. 20, 2021

(54) TOUCH SENSOR

(71) Applicant: DONGWOO FINE-CHEM CO., LTD., Jeollabuk-do (KR)

(72) Inventors: Do Hyoung Kwon, Gyeonggi-do (KR); Sung Jin Noh, Gyeonggi-do (KR); Sang Jin Park, Gyeonggi-do (KR); Han Tae Ryu, Chungcheongbuk-do (KR); Jun Gu Lee, Gyeonggi-do (KR); Cheol Hun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 16/288,471

(22) Filed: Feb. 28, 2019

(65) Prior Publication Data

US 2019/0265840 A1     Aug. 29, 2019

(30) Foreign Application Priority Data

Feb. 28, 2018  (KR) .......................... 10-2018-0024760
Jul. 31, 2018   (KR) .......................... 10-2018-0089240

(51) Int. Cl.
*G06F 3/044*     (2006.01)
*G06F 3/041*     (2006.01)
*G06F 3/042*     (2006.01)

(52) U.S. Cl.
CPC .......... *G06F 3/0446* (2019.05); *G06F 3/0412* (2013.01); *G06F 3/0443* (2019.05);
(Continued)

(58) Field of Classification Search
CPC ...... G06F 3/041; G06F 3/0421; G06F 3/0443; G06F 3/0446; G06F 3/0412;
(Continued)

(56) References Cited

U.S. PATENT DOCUMENTS 10,310,688 B2 *   6/2019   Xie ..................... G06F 3/0443
10,437,405 B2 *  10/2019   Chen .................... G06F 3/0443
(Continued)

FOREIGN PATENT DOCUMENTS

JP     2010-211348 A     9/2010
JP     2013-020529 A     1/2013
(Continued)

OTHER PUBLICATIONS

Notice of Reasons for Refusal from counterpart Japanese Patent Appln. No. 2019-018613 dated Mar. 17, 2020, and its English translation.
(Continued)

*Primary Examiner* — Jason M Mandeville
(74) *Attorney, Agent, or Firm* — DLA Piper LLP (US)

(57) ABSTRACT

Touch sensor including a first detection electrode portion formed on a substrate in a first direction, and a second detection electrode portion formed on the substrate in a second direction intersecting the first direction, wherein a plurality of fine etched patterns are formed in a boundary portion between unit transparent electrodes included in the first detection electrode portion and the second detection electrode portion, the unit transparent electrode has a shape in which a part of the boundary portion having a polygonal shape is removed by fine etched patterns, and the adjacent unit transparent electrodes are electrically connected. The transparent electrode may be visually hidden due to differences in optical properties between electrode regions wherein the transparent electrode is formed and inter-electrode regions wherein a transparent electrode is not formed, and a phenomenon wherein light transmittance of the touch sensor decreases due to the transparent electrode may also be prevented.

9 Claims, 14 Drawing Sheets

(52) U.S. Cl.
CPC .. *G06F 3/0421* (2013.01); *G06F 2203/04103* (2013.01); *G06F 2203/04111* (2013.01); *G06F 2203/04112* (2013.01)

(58) Field of Classification Search
CPC ............... G06F 3/0418; G06F 3/042; G06F 2203/04103; G06F 2203/04109; G06F 2203/04111; G06F 2203/04112; H01B 7/00
USPC ........................................................ 345/176
See application file for complete search history.

(56) References Cited

U.S. PATENT DOCUMENTS

| | | | | |
|---|---|---|---|---|
| 2014/0098057 | A1* | 4/2014 | Lee | G06F 3/044 345/174 |
| 2014/0246225 | A1* | 9/2014 | Mizuno | H05K 1/0274 174/255 |
| 2015/0109245 | A1* | 4/2015 | Chou | G06F 3/044 345/174 |
| 2016/0081183 | A1* | 3/2016 | Ha | H05K 1/0274 |
| 2016/0103526 | A1* | 4/2016 | Sohn | G06F 3/044 345/174 |
| 2017/0228052 | A1* | 8/2017 | Nakamura | G06F 3/044 |
| 2019/0050076 | A1* | 2/2019 | Zhang | G06F 3/0448 |
| 2020/0042141 | A1* | 2/2020 | Kwon | G06F 3/0446 |
| 2020/0050300 | A1* | 2/2020 | Kwon | G06F 3/0443 |

FOREIGN PATENT DOCUMENTS

| | | |
|---|---|---|
| JP | 2017-134402 A | 8/2017 |
| KR | 10-2010-0095886 | 9/2010 |
| KR | 10-2012-0117940 | 10/2012 |

OTHER PUBLICATIONS

Decision for Refusal from counterpart Japanese Patent Appln. No. 2019-018613 dated Nov. 13, 2020, and its English translation.

* cited by examiner

TOUCH SENSOR

CROSS-REFERENCE TO RELATED PATENT APPLICATION

This U.S. non-provisional patent application claims priority under 35 U.S.C. § 119 of Korean Patent Application No. 10-2018-0024760 filed on Feb. 28, 2018 and Korean Patent Application No. 10-2018-0089240 filed on Jul. 31, 2018 in the Korean Patent Office, the entire contents of which are hereby incorporated by reference.

FIELD OF THE INVENTION

The present invention relates to a touch sensor, and more specifically, to a touch sensor in which unit transparent electrodes defined by a plurality of fine etched patterns are formed on transparent electrodes to prevent the transparent electrodes from being unnecessarily visual to a user due to a difference in an optical property between an electrode region in which the transparent electrodes are formed and an inter-electrode region in which transparent electrodes are not formed and to prevent a phenomenon in which the light transmittance of the touch sensor decreases due to the transparent electrodes in order to improve the visibility and light transmittance of the touch sensor.

BACKGROUND OF THE INVENTION

Description of Related Art

A touch sensor, which is a sensor to determine a touch position by reacting to a touch in a case in which a user touches an image displayed on a screen with a finger or touch pen, is formed to have a structure which is installed in a display apparatus such as a liquid crystal display (LCD), an organic light-emitting diode (OLED), etc.

Generally, the touch sensor includes touch detection regions having transparent electrodes configured to detect a touch operation of a user and formed in intersecting directions, and the touch detection regions may be divided into electrode regions in which the transparent electrodes are present and inter-electrode regions in which transparent electrodes are not present.

Since the optical property including the transmittance and reflectivity of the electrode region is different from that of the inter-electrode region, there is a problem in that the electrode regions and the inter-electrode regions are distinguished from each other and unnecessarily visible to the user.

In addition, since the transmittance of the electrode region is lower than that of the inter-electrode region, there is a problem in that a pattern included in the touch sensor is visible to the user.

Prior-Art Documents (Patent Documents) Korean Patent Laid-Open Publication No. 10-2014-0051649 (May 2, 2014, METAL MESH TYPE TOUCH SCREEN PANEL)

The conventional problems will be more specifically described below.

SUMMARY OF THE INVENTION

FIG. 1 is a cross-sectional view illustrating a conventional touch sensor, FIG. 2(a) and FIG. 2(b) provides views illustrating examples of a shape of an upper surface of the conventional touch sensor illustrated in FIG. 1, and FIG. 3 is a graph for describing a principle in which a transparent electrode is visual to a user due to a low frequency component of a spatial frequency generated by the transparent electrode in the conventional touch sensor illustrated in FIG. 1. A unit of the spatial frequency of FIG. 3 is cycle per degree (CPD).

Referring to FIGS. 1 to 3, the conventional touch sensor includes a first detection electrode 2 formed on a substrate 1 in a first direction and formed of an indium tin oxide (ITO) material, a second detection electrode 3 formed in a second direction intersecting the first direction and formed of an ITO material, an insulating layer 4 which insulates the first detection electrode 2 from the second detection electrode 3, a bridge pattern 5 which connects two second detection electrodes 3 and is formed of an ITO material, and an element protection layer 6. FIG. 2A is a view illustrating an example of a shape of the first detection electrode 2 and the second detection electrode 3 and FIG. 2B is a view illustrating an example of a state in which the bridge pattern 5 is formed in addition to the first detection electrode 2 and the second detection electrode 3.

In such a conventional touch sensor, optical properties, such as transmittance, reflectivity, transmission color sense, and reflection color sense, of the ITOs vary according to thicknesses of the ITOs. Accordingly, a difference between the optical properties of electrode regions in which the ITOs are formed and inter-electrode regions in which ITO is not formed occurs, and thus there is a problem in that an ITO pattern is visually recognized by the user due to transmitted light and reflected light.

In addition, since the ITO having a large pitch and a thick thickness is applied to the bridge pattern 5, there is a problem in that the bridge pattern 5 is visual to the user when external light is emitted.

A main factor of such visibility degradation is a low frequency component of a spatial frequency generated by the first detection electrode 2, the second detection electrode 3, and the bridge pattern 5. That is, since the touch sensor is formed by the first detection electrode 2, the second detection electrode 3, and the bridge pattern 5 being repeated with a predetermined spatial cycle, in a case in which external light is emitted to the touch sensor, the low frequency component of the spatial frequency corresponding to the spatial distribution cycle of the first detection electrode 2, the second detection electrode 3, and the bridge pattern 5 is amplified, and thus there is a problem in that the ITOs forming the first detection electrode 2, the second detection electrode 3, and the bridge pattern 5 and edge regions of the ITOs are unnecessarily visual to the user.

1. Technical Problem

A technical objective of the present invention is to form fine etched patterns for improving visibility and light transmittance on a transparent electrode to prevent the transparent electrode from being unnecessarily visual to a user due to a difference between optical properties of an electrode region in which the transparent electrode is formed and an inter-electrode region in which a transparent electrode is not formed and to prevent a phenomenon in which light transmittance decreases due to the transparent electrode.

In addition, a technical objective of the present invention is also to convert a low frequency component of a spatial frequency generated by the transparent electrode to a high frequency component which is not visual to the user in order to improve the visibility property and light transmittance of the touch sensor using the fine etched patterns formed on the transparent electrode.

2. Solution to Problem

A touch sensor according to a first aspect of the present invention includes a first detection electrode portion formed on a substrate in a first direction and a second detection electrode portion formed on the substrate in a second direction intersecting the first direction, wherein a plurality of fine etched patterns are formed in a boundary portion between unit transparent electrodes included in the first detection electrode portion and the second detection electrode portion, the unit transparent electrode has a shape in which a part of the boundary portion having a polygonal shape is removed by the fine etched pattern, and the adjacent unit transparent electrodes are electrically connected to each other.

A touch sensor according to a second aspect of the present invention includes first detection electrode portions formed on a substrate in a first direction to be connected to each other, second detection electrode portions formed on the substrate in a second direction intersecting the first direction to be separated from each other, an insulating layer formed on the substrate on which the first detection electrode portion and the second detection electrode portion are formed such that at least a part of the second detection electrode portion is exposed through a through hole, and a bridge electrode portion which fills the through hole and is formed on the insulating layer to connect two adjacent second detection electrode portions with the first detection electrode portion interposed therebetween, wherein a plurality of fine etched patterns are formed in a boundary portion between unit transparent electrodes included in the first detection electrode portion and the second detection electrode portion, the unit transparent electrode has a shape in which a part of the boundary portion having a polygonal shape is removed by the fine etched pattern, and the adjacent unit transparent electrodes are electrically connected.

A touch sensor according to a third aspect of the present invention includes first detection electrode portions formed on a substrate in a first direction to be connected to each other, an insulating layer formed on the substrate on which the first detection electrode portions are formed, and second detection electrode portions formed on the insulating layer in a second direction intersecting the first direction to be connected to each other, wherein a plurality of fine etched patterns are formed in a boundary portion between unit transparent electrodes included in the first detection electrode portion and the second detection electrode portion, the unit transparent electrode has a shape in which a part of the boundary portion having a polygonal shape is removed by the fine etched pattern, and the adjacent unit transparent electrodes are electrically connected to each other.

In the touch sensor according to the first to third aspects of the present invention, the plurality of unit transparent electrodes defined by the fine etched patterns may have a tessellation structure.

In the touch sensor according to the first to third aspects of the present invention, the unit transparent electrode may have a hexagonal shape, a triangular shape, or a quadrilateral shape.

In the touch sensor according to the first to third aspects of the present invention, a pitch of the unit transparent electrode may be in a range of 100 μm to 500 μm.

In the touch sensor according to the first to third aspects of the present invention, a width of the fine etched pattern may be in a range of 5 μm to 20 μm.

In the touch sensor according to the first to third aspects of the present invention, a width of a connecting portion which connects the adjacent unit transparent electrodes may be in a range of 20 μm to 60 μm.

In the touch sensor according to the first to third aspects of the present invention, the transmittances of the first detection electrode portion and the second detection electrode portion may increase due to the plurality of fine etched patterns formed in the boundary portion of the unit transparent electrode.

In the touch sensor according to the first to third aspects of the present invention, the unit transparent electrode may be formed by the plurality of fine etched patterns, the first detection electrode portion may be distinguished from the second detection electrode portion by using the same shape as that of the fine etched pattern included in the unit transparent electrode, and a spatial high frequency component may be disposed on a front surface of the touch sensor.

The touch sensor according to the first to third aspects of the present invention may further include an inter-electrode dummy formed between the first detection electrode portion and the second detection electrode portion, having a shape which is the same as that of the unit transparent electrode, and electrically insulated from the unit transparent electrode.

In the touch sensor according to the first to third aspects of the present invention, a plurality of dummy patterns having a spatial frequency which is the same as that of the fine etched patterns may be interposed between the first detection electrode portion and the second detection electrode portion to dispose the same high frequency component on a front surface of the touch sensor so that a pattern of the touch sensor is not seen due to the same high frequency component disposed on the front surface of the touch sensor.

The touch sensor according to the first to third aspects of the present invention may further include a separating layer formed on the substrate.

The touch sensor according to the first to third aspects of the present invention may further include an internal protective layer formed on the separating layer.

3. Advantageous Effects

According to the present invention, there are advantageous effects.

Since fine etched patterns for improving visibility and light transmittance are formed on a transparent electrode, the transparent electrode can be prevented from being unnecessarily visual to a user due to a difference between optical properties of an electrode region in which the transparent electrode is formed and an inter-electrode region in which the transparent electrode is not formed, and a phenomenon in which the light transmittance decreases due to the transparent electrode can also be prevented.

In addition, since a low frequency component of a spatial frequency generated by the transparent electrode is converted to a high frequency component which is visual to the user using the fine etched patterns formed on the transparent electrode, the visibility property of the touch sensor can be improved and the light transmittance of the touch sensor can also be increased.

BRIEF DESCRIPTION OF DRAWINGS

FIG. 2(a) is a view illustrating an example of a shape of the first detection electrode 2 and the second detection electrode 3 and FIG. 2(b) is a view illustrating an example of a state in which the bridge pattern 5 is formed in addition to the first detection electrode 2 and the second detection electrode 3.

DETAILED DESCRIPTION OF EMBODIMENTS

Figure 1:
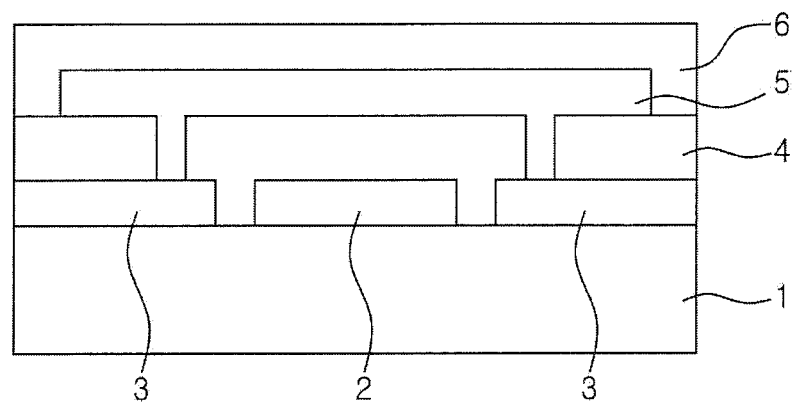
FIG. 1 is a cross-sectional view illustrating a conventional touch sensor.
Figure 2A:
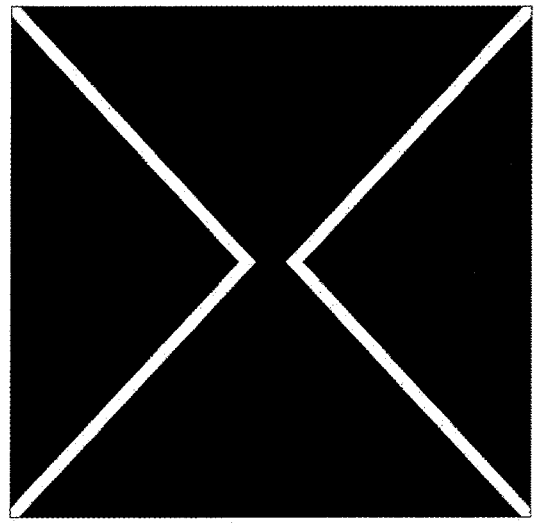
FIG. 2(a) and FIG. 2(b) provides views illustrating a shape of an upper surface of the conventional touch sensor illustrated in FIG. 1.
Figure 2B:
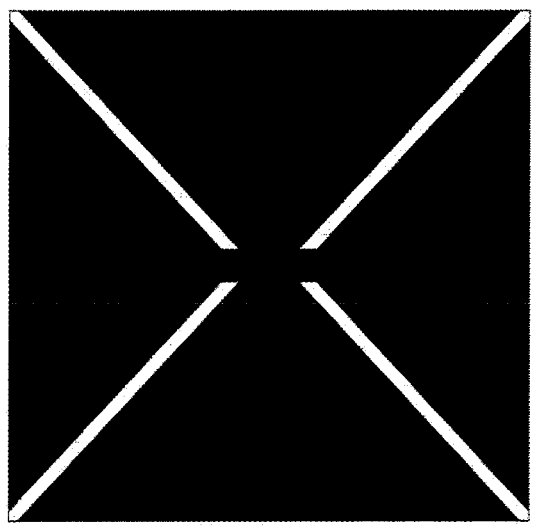

In embodiments according to the concept of the present invention disclosed in the specification, specific structural and functional descriptions are directed only to providing examples for describing the embodiments of the present invention, and the embodiments according to the concept of the present invention may be implemented in various forms, and thus the present invention is not limited to the embodiments described in the specification.

While the embodiments according to the concept of the present invention may be modified in various ways and have various alternative forms, examples of the embodiments are shown in the drawings and described in detail below. There is no intent to limit the present invention to the particular forms disclosed. On the contrary, the present invention covers all modifications, equivalents, and alternatives falling within the spirit and scope of the present invention.

It should be understood that, although the terms first, second, and the like may be used herein in reference to elements of the present invention, such elements are not to be construed as limited by the terms. The terms are only used to distinguish one element from another. For example, a first element could be termed a second element, and a second element could be termed a first element without departing from the scope of the present invention.

It should be understood that, when an element is referred to as being "connected" or "coupled" to another element, the element may be directly connected or coupled to another element, or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," and the like).

The terminology used herein to describe the embodiments of the present invention is not intended to limit the scope of the present invention. The articles "a," "an," and "the" are singular in that they have a single referent, however the use of the singular form in the present document does not preclude the presence of more than one referent unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein should be interpreted as is customary in the art to which the present invention belongs. It should be further understood that terms in common usage should also be interpreted as is customary in the relevant art and not in an idealized or overly formal sense unless expressly so defined herein.

As will be described below, FIGS. 4 to 10 are views for describing a first embodiment which uses a bridge electrode, and FIGS. 11 to 17 are views for describing a second embodiment including a counter electrode structure which does not use a bridge electrode.

The technical characteristics of the present invention which can be applied to the first embodiment and the second embodiment regardless of a stacked structure according to the first embodiment and the second embodiment will be briefly described below.

Regardless of the stacked structure according to the first embodiment and the second embodiment, a touch sensor according to the present invention includes a first detection electrode portion formed on a substrate in a first direction, and a second detection electrode portion formed on the substrate in a second direction intersecting the first direction. A plurality of fine etched patterns are formed in a boundary portion of a unit transparent electrode included in the first detection electrode portion and the second detection electrode portion, a part of the polygonal boundary portion of the unit transparent electrode is removed according to the fine etched patterns, and adjacent unit transparent electrodes are electrically connected.

Since descriptions of the plurality of fine etched patterns and the unit transparent electrode divided by the fine etched patterns are the same as those in the first embodiment and the second embodiment, repeated descriptions will be omitted.

Figure 4:
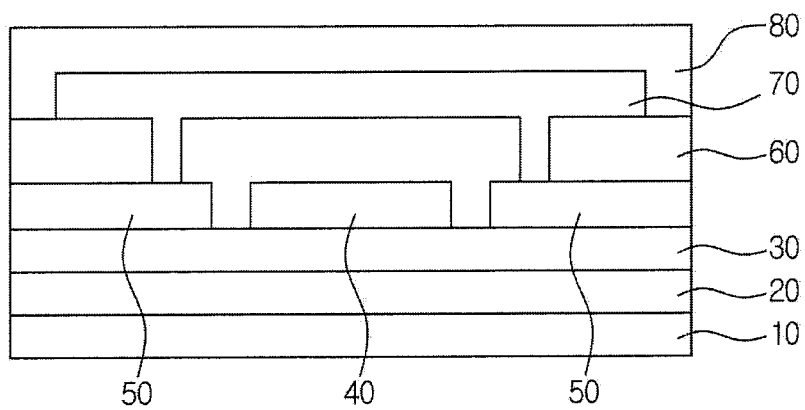
FIG. 4 is a cross-sectional view illustrating an example of a touch sensor according to a first embodiment of the present invention.

FIG. 4 is a cross-sectional view illustrating a touch sensor according to the first embodiment of the present invention, and FIG. 5 is a plan view illustrating one example case in which a unit transparent electrode has a hexagonal shape according to the first embodiment of the present invention.

Referring to FIGS. 4 and 5, the touch sensor according to the first embodiment of the present invention includes a substrate 10, a first detection electrode portion 40, a second detection electrode portion 50, an insulating layer 60, a bridge electrode portion 70, and an element protection layer 80.

As will be described below, main technical features of the touch sensor according to the first embodiment of the present invention are that a plurality of fine etched patterns are formed on a boundary portion of the unit transparent electrode included in the first detection electrode portion 40 and the second detection electrode portion 50, a part of the polygonal boundary portion of the unit transparent electrode is removed according to the fine etched patterns, and adjacent unit transparent electrodes are electrically connected.

Figure 3:
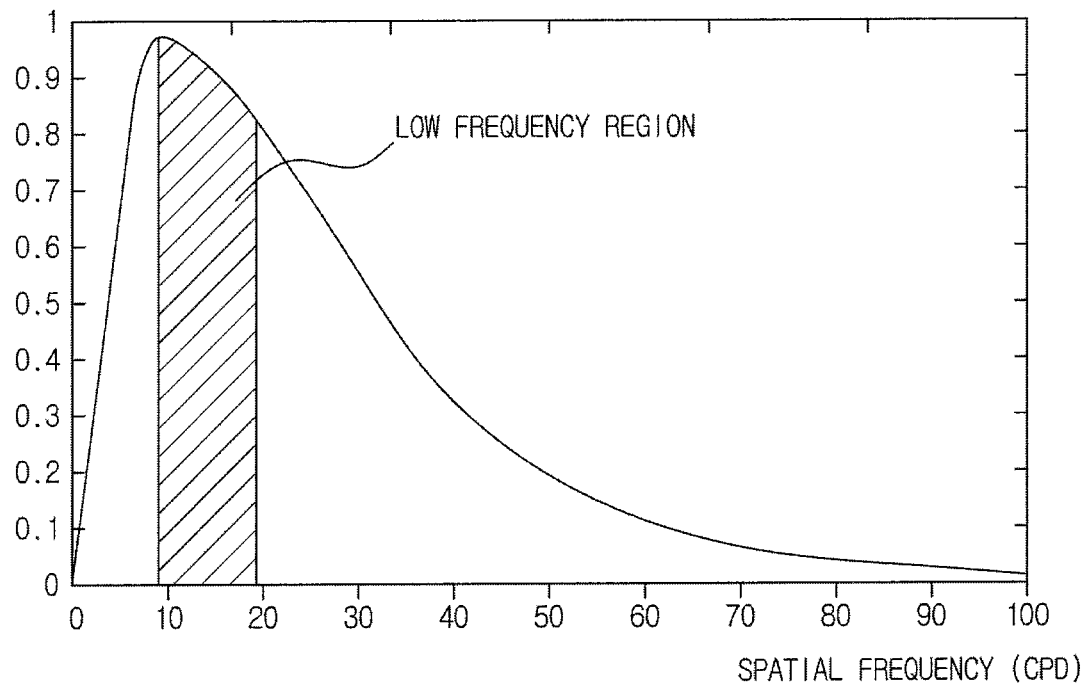
FIG. 3 is a graph for describing a principle in which a transparent electrode is visual to a user due to a low frequency component of a spatial frequency generated by the transparent electrode in the conventional touch sensor illustrated in FIG. 1.
Figure 19:
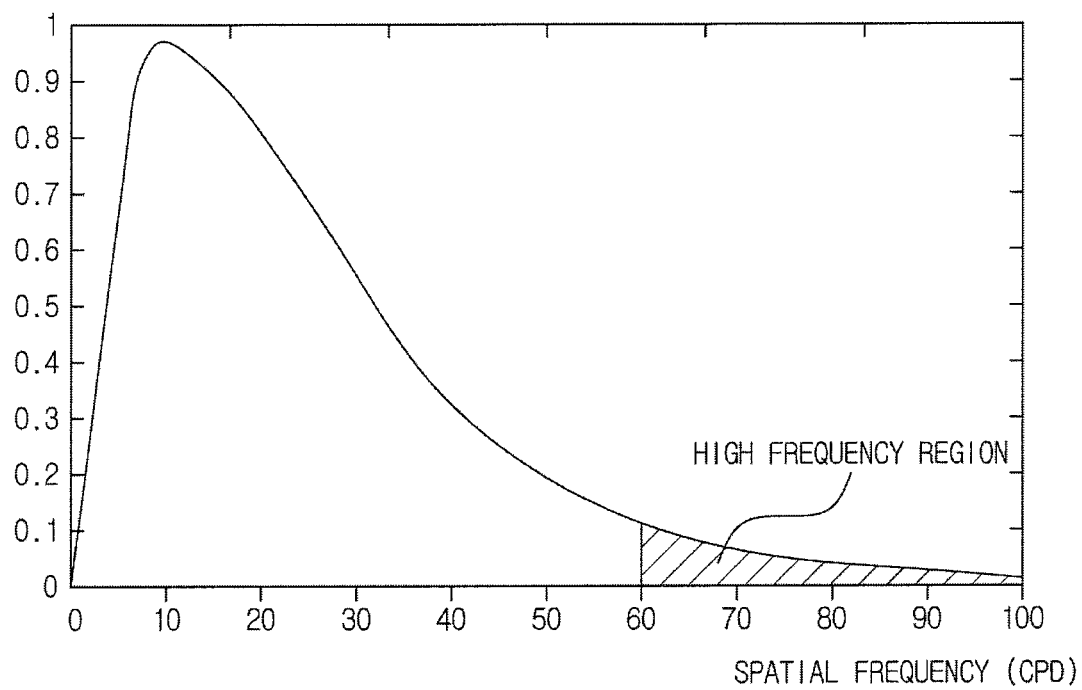
FIG. 19 is a graph for describing a principle in which a low frequency component of a spatial frequency generated due to the transparent electrode is converted to a high frequency component which is not visual to the user due to the plurality of fine etched patterns formed on the boundary portion of the unit transparent electrode of the touch sensor according to the embodiments of the present invention.

Referring to FIG. 3, which is referred to in the descriptions of the problems of the conventional touch sensor, and FIG. 19, which is a graph for describing a principle in which a low frequency component of a spatial frequency generated due to the transparent electrode is converted to a high frequency component which is not visual to a user due to the plurality of fine etched patterns formed in the boundary portion of the unit transparent electrode in the touch sensor according to the embodiments of the present invention, the touch sensor is formed such that the spatial high frequency component is disposed at a front surface of the touch sensor by forming the unit transparent electrode defined by the plurality of fine etched patterns and dividing the first detection electrode portion 40 and the second detection electrode portion 50 in a shape which is the same as that of the fine etched patterns which define the unit transparent electrodes.

In other words, the plurality of fine etched patterns formed in the boundary portion of the unit transparent electrode included in the first detection electrode portion 40 and the second detection electrode portion 50 are repeatedly formed in the touch sensor with a predetermined spatial cycle, and the low frequency component of the spatial frequency generated by the first detection electrode portion 40 and the second detection electrode portion 50 each having a pitch which is greater than that of the fine etched pattern is converted to the high frequency component which is not visual to the user to improve the visibility property of the touch sensor. In addition, since the transmittance of each of the first detection electrode portion 40 and the second detection electrode portion 50 increases due to the plurality of fine etched patterns formed in the boundary portion of the unit transparent electrode, the light transmittance of the entire touch sensor increases. A unit of the spatial frequency of FIG. 19 is cycle per degree (CPD). According to the embodiments of the present invention, it can be seen that a minimum value of the spatial frequency is about 60 CPD or less, and the low frequency component of the spatial frequency generated due to the transparent electrodes is converted to the high frequency component of a minimum 60 CPD, which is not visual to the user due to the plurality of fine etched patterns, which is the technical feature of the present invention.

In the touch sensor according to the first embodiment of the present invention, the unit transparent electrode defined by the fine etched patterns may have a polygonal shape such as a hexagonal shape, a triangular shape, and a quadrilateral shape in order to maximize a visibility improvement effect. The plurality of unit transparent electrodes may have a tessellation structure. More preferably, the unit transparent electrode may have a regular polygonal shape such as a regular hexagonal shape, a regular triangular shape, and a regular quadrilateral shape. The plurality of unit transparent electrodes may have a regular tessellation structure. The regular tessellation structure has only one regular polygonal shape and has the unit fine etched patterns each having the regular hexagonal shape, the regular triangular shape, or the regular quadrilateral shape.

Figure 7:
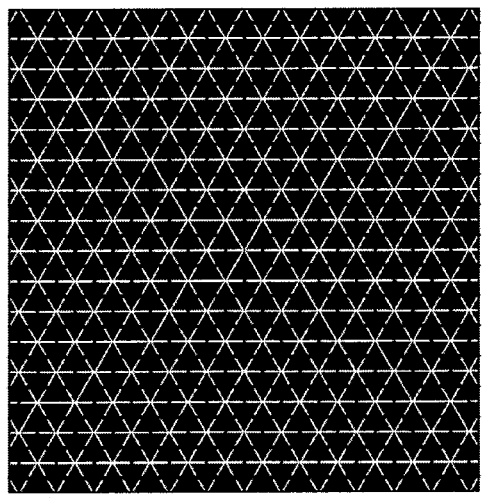
FIG. 7 is a plan view illustrating one example case in which the unit transparent electrode has a triangular shape according to the first embodiment of the present invention.
Figure 9:
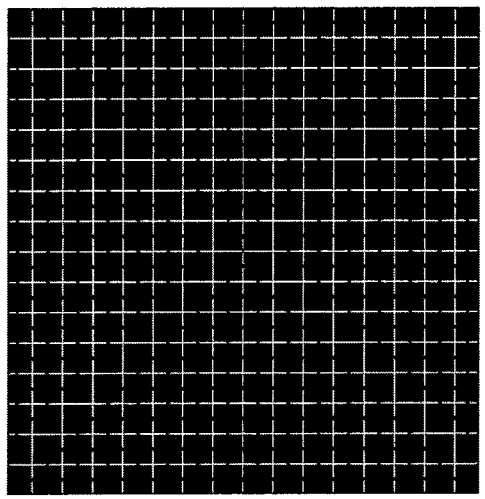
FIG. 9 is a plan view illustrating one example case in which the unit transparent electrode has a quadrilateral shape according to the first embodiment of the present invention.

FIG. 5 shows an example of the regular tessellation structure including the plurality of unit transparent electrodes in a case in which the unit transparent electrode defined by the plurality of fine etched patterns has the hexagonal shape, FIG. 7 shows an example of the regular tessellation structure including the plurality of unit transparent electrodes in a case in which the unit transparent electrode has the triangular shape, and FIG. 9 shows an example of the regular tessellation structure including the plurality of unit transparent electrodes in a case in which the unit transparent electrode has the quadrilateral shape.

Figure 6A:
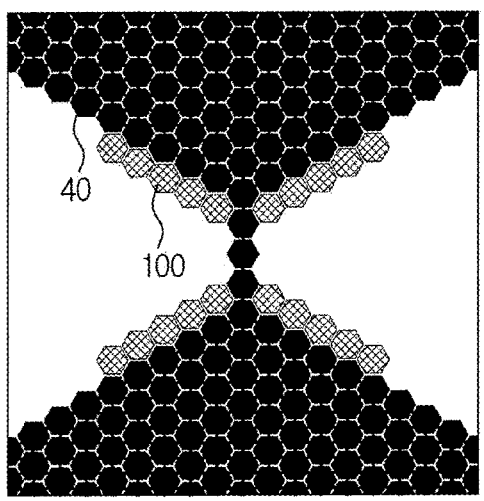
FIG. 6(a), FIG. 6(b), FIG. 6(c) and FIG. 6(d) provide a plan view illustrating another example case in which the unit transparent electrode has the hexagonal shape according to the first embodiment of the present invention.
Figure 6B:
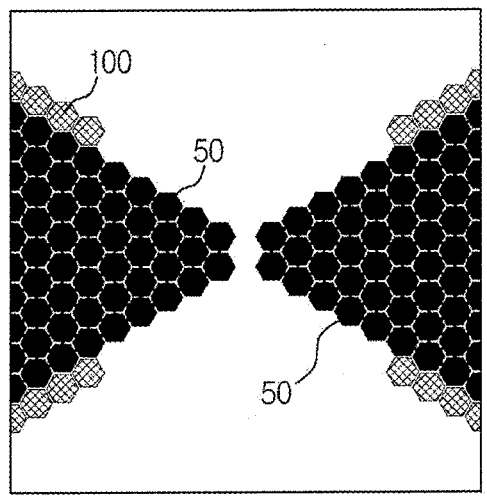
Figure 6C:
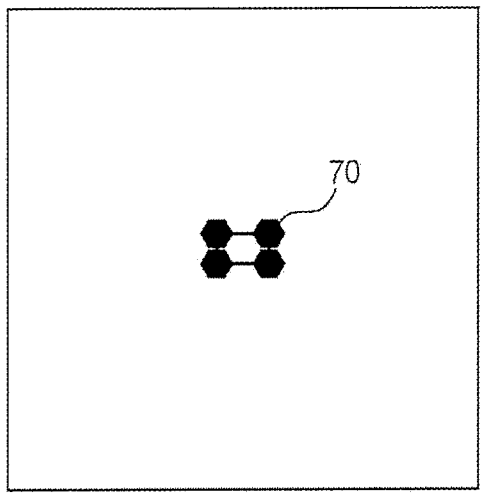
Figure 6D:
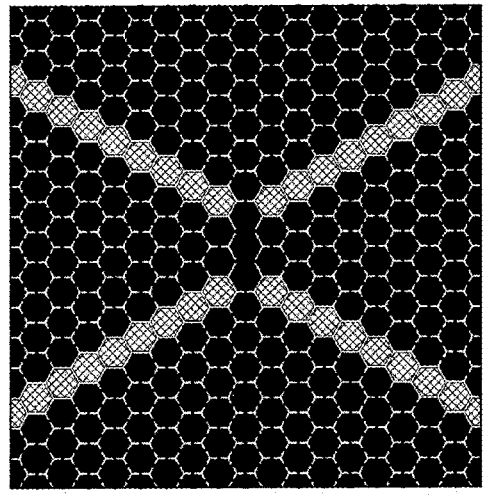

Meanwhile, for example, in a case in which a width of an inter-electrode region which is a gap between the first detection electrode portion 40 and the second detection electrode portion 50 is wide, inter-electrode dummies 100 each having a shape which is the same as that of the unit transparent electrode and electrically insulated from the unit transparent electrode included in the first detection electrode portion 40 and the second detection electrode portion 50 may be additionally formed as illustrated in FIGS. 6(a), (b), (c) and (d). As illustrated in FIGS. 6(a), (b), (c) and (d), although the plurality of unit transparent electrodes included in the first detection electrode portion 40 and the second detection electrode portion 50 are electrically connected, the plurality of inter-electrode dummies 100 which are present in the inter-electrode regions between the first detection electrode portion 40 and the second detection electrode portion 50 are not electrically connected. When the plurality of inter-electrode dummies 100 are formed as described above, a plurality of dummy patterns having a spatial frequency which is the same as that of the fine etched patterns are formed in the gap between the first detection electrode portion 40 and the second detection electrode portion 50 to dispose the same high frequency component on the front surface of the touch sensor, and thus a touch sensor pattern cannot be seen due to the same high frequency component disposed on the front surface of the touch sensor.

Figure 8:
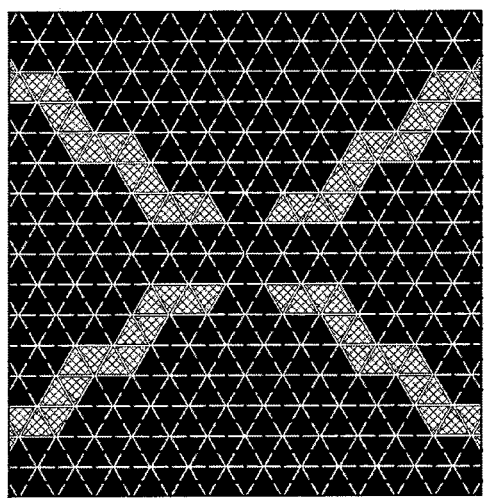
FIG. 8 is a plan view illustrating another example case in which the unit transparent electrode has the triangular shape according to the first embodiment of the present invention.
Figure 10:
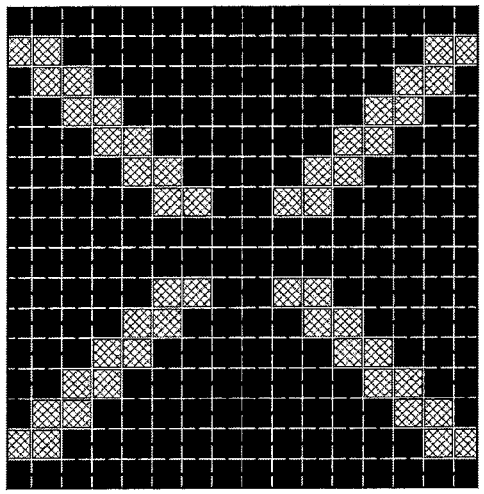
FIG. 10 is a plan view illustrating another example case in which the unit transparent electrode has the quadrilateral shape according to the first embodiment of the present invention.

FIG. 6(*a*), (*b*), (*c*) and (*d*) shows an example of the regular tessellation structure including the plurality of inter-electrode dummies 100 and the plurality of unit transparent electrodes in the case in which the unit transparent electrode included in the first detection electrode portion 40 and the second detection electrode portion 50 has the hexagonal shape, FIG. 8 shows an example of the regular tessellation structure including the plurality of inter-electrode dummies 100 and the plurality of unit transparent electrodes in the case in which the unit transparent electrode has the triangular shape, and FIG. 10 shows an example of the regular tessellation structure including the plurality of inter-electrode dummies 100 and the plurality of unit transparent electrodes in the case in which the unit transparent electrode has the quadrilateral shape.

Figure 18A:
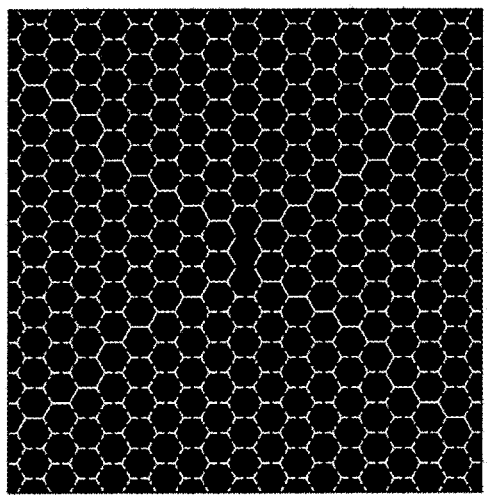
FIG. 18(a) and FIG. 18(b) provide a plan view illustrating an example of a plurality of fine etched patterns formed on the unit transparent electrode and a boundary portion of the unit transparent electrode of the touch sensor according to the embodiments of the present invention.
Figure 18B:
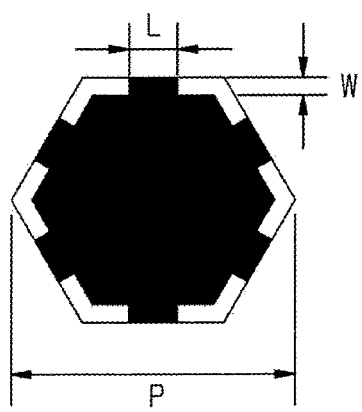

For example, a pitch P of the unit transparent electrode may be in the range of 100 μm to 500 μm, and a width W of the fine etched pattern which defines the unit transparent electrode may be in the range of 5 μm to 20 μm, as illustrated in FIGS. 18(*a*) and (*b*). When the unit transparent electrode is formed as described above and external light is emitted to the touch sensor, the low frequency component of the spatial frequency generated by the transparent electrodes is converted to the high frequency component which is not visual to the user, and the light transmittance of the electrode region in which the transparent electrode is present, that is, the first detection electrode portion 40 and the second detection electrode portion 50, also increases to increase the light transmittance of the entire touch sensor.

In addition, for example, a width L of a connecting portion which connects the adjacent unit transparent electrodes may be in the range of 20 μm to 60 μm, as illustrated in FIGS. 18(*a*) and (*b*). When the connecting portion is formed as described above, an increase in resistance, which may be generated during a process of connecting the adjacent unit transparent electrodes, may be prevented and visibility degradation due to the connecting portion may also be prevented.

An experiment related to the improvement of a visibility property according to the unit transparent electrode defined by the plurality of fine etched patterns, that is, a property in which the transparent electrode is not unnecessarily visual to the user actually depends on eyesight of the user. An experimental group including one hundred persons was questioned by the applicant whether the transparent electrode was visible, and the result was that the entire experimental group answered that the transparent electrode was not seen.

Table 1 below shows improved result values of the optical properties according to the pitch P of the unit transparent electrode defined by the plurality of fine etched patterns. In Table 1, a* and b* are chromatic indices of an L*a*b* color space (Official name: CIE 1976 L*a*b* perceived color space)

TABLE 1

| | Transmission Property | | | Reflection Property | | |
|---|---|---|---|---|---|---|
| | Transmittance | a* | b* | Reflectivity | a* | b* |
| Conventional Technology | 85.5 | 0.13 | 3.17 | 13.03 | −1.64 | −10.14 |
| Pitch (P) = 100 μm | 86.2 | 0.13 | 3.04 | 12.42 | −1.58 | −9.72 |
| Pitch (P) = 200 μm | 85.9 | 0.11 | 3.01 | 12.74 | −1.54 | −9.67 |
| Pitch (P) = 300 μm | 85.9 | 0.13 | 3.05 | 13.05 | −1.72 | −9.88 |
| Pitch (P) = 400 μm | 85.7 | 0.12 | 3.14 | 12.58 | −1.83 | −10.32 |
| Pitch (P) = 500 μm | 85.4 | 0.12 | 3.08 | 13.09 | −1.82 | −9.92 |

Referring to Table 1, in a case in which the pitch P of the unit transparent electrode defined by the plurality of fine etched patterns is in the range of 100 μm to 500 μm, it can be seen that the transmittance and reflectivity properties were improved from or substantially the same as those of the conventional technology. In addition, a* and b* which were the chromatic indices were also not significantly changed such that a phenomenon of perceived color distortion did not occur to the user.

Hereinafter, the components will be described in detail.

The substrate 10 is a base which structurally supports the components included in the touch sensor.

As an example, the substrate 10 may be formed of a hard material such as glass and stainless steel (SUS) having excellent properties such as heat and chemical resistances.

As another example, the substrate 10 may be formed of a soft material. When the substrate 10 is formed as described above, the touch sensor may be stably applied to a display as a bendable, foldable, rollable, or stretchable type that requires a bending property.

For example, the substrate 10 formed of the soft material may be a transparent optical film or polarizing plate.

A film having an high transparency, high mechanical strength, and high thermal stability may be used as the transparent optical film, and the specific example of the transparent optical film may be a film formed of: a thermoplastic resin such as a polyester-based resin including polyethylene terephthalate, polyethylene isophthalate, polyethylene naphthalate, and polybutylene terephthalate; a cellulose-based resin including diacetylcellulose and triacetylcellulose; a polycarbonate-based resin; an acrylic-based resin including polymethyl (meth) acrylate and polyethyl (meth) acrylate; a styrene-based resin including polystyrene and acrylonitrile-styrene copolymer; a polyolefin-based resin including polyethylene, polypropylene, cyclo- or norbornene-structured polyolefin, and ethylene-propylene copolymer; a vinyl chloride-based resin; an amide-based resin including nylon and aromatic polyamide; an imide-based resin; a polyether sulfone-based resin; a sulfone-based resin; a polyether ether ketone-based resin; a sulfided polyphenylene-based resin; a vinyl alcohol-based resin; a vinylidene chloride-based resin; a vinyl butyral-based resin; an allylate-based resin; a polyoxymethylene-based resin; or an epoxy-based resin, and a film formed of a blend of the thermoplastic resin may also be used as the transparent optical film. In addition, a film formed of a thermosetting resin such as a (meth)acrylic-based resin, a urethane-based resin, an acryl urethane-based resin, an epoxy-based resin, or a silicone-based resin, or an ultraviolet curable resin may also be used as the transparent optical film. Although the thickness of the transparent optical film may also be properly determined, the thickness may be generally determined in the range of 1 to 500 μm in consideration of workability such as strength and handling properties and thin layer properties. Particularly, the thickness is preferably in the range of 1 to 300 µm, and more preferably in the range of 5 to 200 µm.

One or more kinds of additives may also be contained in the transparent optical film. For example, the additive may be an ultraviolet absorber, an antioxidant, a lubricant, a plasticizer, a mold releasing agent, a coloring inhibitor, a flame retardant, a nucleating agent, an antistatic agent, a pigment, a colorant, or the like. The transparent optical film may have a structure in which one or both surfaces of the transparent optical film includes various functional layers such as a hard coated layer, an antireflection layer, and a gas barrier layer, but the functional layers are not limited thereto, and various functional layers may be included in the one or both surfaces according to a use thereof.

In addition, a surface treatment may be performed on the transparent optical film according to a requirement. Such a surface treatment may be a dry treatment such as a plasma treatment, a corona treatment, or a primer treatment, or a chemical treatment such as an alkali treatment including a saponification treatment.

In addition, the transparent optical film may be an isotropic film, a phase difference film, or a protective film.

A phase difference Ro (Ro=[(nx−ny)xd], nx and ny are principal refraction indices of a flat surface of a film, and d is a thickness of the film) of the isotropic film is 40 nm or less, and is preferably 15 nm or less. A phase difference Rth (Rth=[(nx+ny)/2−nz]xd, nx and ny are principal refraction indices of the flat surface of the film, nz is a refraction index in a thickness direction of the film, and d is the thickness of the film) is in the range of −90 nm to +75 nm, is preferably in the range of −80 nm to +60 nm, and is particularly preferably in the range of −70 nm to +45 nm.

The phase difference film is a film manufactured using a method of uniaxial or biaxial stretching of polymer, polymer coating, or liquid crystal coating and is generally used to improve and adjust optical properties by compensating for a viewing angle, improving a color sense and light-shielding, and adjusting color tone of a display. A kind of the phase difference film includes a ½ or ¼ wave plate, a positive C plate, a negative C plate, a positive A plate, a negative A plate, and a biaxial wave plate.

The protective film may be a film which is formed of a polymer resin and includes at least one surface including an adhesive layer or a film formed of polypropylene and the like having a self-adhesiveness and may be used in order to protect the surface of the touch sensor and improve processability.

Any polarizing plate which is used for a display panel and known in the art may be used. Specifically, the polarizing plate may be a polarizer formed by stretching a polyvinyl alcohol film and installing a protective layer on at least one surface of a polarizer which is dyed with iodine or a dichroic dye, liquid crystals which are oriented to have a polarizer property, or a transparent film coated with an orientation resin such as polyvinyl alcohol, stretched, and dyed but is not limited thereto.

A separating layer 20 is a layer which can be applied to the touch sensor in a case in which the substrate 10 is formed of a soft material to separate the components of the touch sensor from a hard carrier substrate on which the components are formed during a manufacturing process of the touch sensor. The components separated from the carrier substrate may be attached to the film type substrate 10 formed of the soft material through a roll-to-roll method or the like.

A material of the separating layer 20 is not specifically limited as long as the material has a predetermined separation force and transparency. For example, the separating layer 20 may be formed of a polymer such as a polyimide-based polymer, a poly vinyl alcohol-based polymer, a polyamic acid-based polymer, a polyamide-based polymer, a polyethylene-based polymer, a polystyrene-based polymer, a polynorbornene-based polymer, a phenylmaleimide copolymer-based polymer, a polyazobenzene-based polymer, a polyphenylenephthalamide-based polymer, a polyester-based polymer, a polymethyl methacrylate-based polymer, a polyarylate-based polymer, a cinnamate-based polymer, a coumarin-based polymer, a phthalimidine-based polymer, a chalcone-based polymer, or an aromatic acetylene-based polymer, and one or a combination of two or more kinds thereof may be used as the separating layer 20.

The separation force of the separating layer 20 is not specifically limited, but may be, for example, in the range of 0.01 N/25 mm to 1 N/25 mm, and may be preferably in the range of 0.01 N/25 mm to 0.1 N/25 mm. In the case in which the separation force is in the above range, the components of the touch sensor may be easily separated from the carrier substrate without residue, and thus curls and cracks due to tension generated during the separation can be decreased in the manufacturing process of the touch sensor.

The thickness of the separating layer 20 is not particularly limited but may be, for example, in the range of 10 to 1,000 nm and may be preferably in the range of 50 to 500 nm. In the case in which the thickness is in the above range, the separation force can become stable, and a uniform pattern can be formed.

An internal protective layer 30 is a layer formed on the separating layer 20 and is an optional layer which can be omitted according to necessity. The internal protective layer 30 serves to prevent the separating layer 20 from being exposed to an etchant for forming the first detection electrode portion 40, the second detection electrode portion 50, and the bridge electrode portion 70 in the manufacturing process of the touch sensor according to the embodiments of the present invention.

Any polymer known in the art may be used as a material of the internal protective layer 30 without limitation. For example, an organic insulating film may be used as the internal protective layer 30, and the internal protective layer 30 may be formed of a curable composition including a polyol and a melamine curing agent among polymers, but the present invention is not limited thereto.

A specific kind of the polyol may be a polyether glycol derivative, a polyester glycol derivative, a polycaprolactone glycol derivative, or the like, but the present invention is not limited thereto.

A specific kind of the melamine curing agent may be a methoxy methyl melamine derivative, a methyl melamine derivative, a butyl melamine derivative, an isobutoxy melamine derivative, a butoxy melamine derivative, or the like, but the present invention is not limited thereto.

As another example, the internal protective layer 30 may be formed of a hybrid organic and inorganic curable composition, and in a case in which an organic compound and an inorganic compound are used together, it is preferable from a viewpoint of reducing cracks generated during the separation.

The above-described components may be used as the organic compound, and silica-based nanoparticles, silicon-based nanoparticles, glass nanofibers, or the like may be used as the inorganic compound, but the present invention is not limited thereto.

The first detection electrode portions 40 are formed to be connected to each other on the substrate 10 in the first direction, the second detection electrode portions 50 are formed to be separated apart from each other on the substrate 10 in the second direction intersecting the first direction, the insulating layer 60 is formed on the substrate 10 on which the first detection electrode portion 40 and the second detection electrode portion 50 are formed such that at least a part of the second detection electrode portion 50 is exposed through a through hole, and the bridge electrode portion 70 fills the through hole and is formed on the insulating layer 60 to connect two adjacent second detection electrode portions 50 formed with the first detection electrode portion 40 interposed therebetween.

Although it was described above, the plurality of fine etched patterns are formed in the boundary portion of the unit transparent electrode included in the first detection electrode portion 40 and the second detection electrode portion 50, a part of the polygonal boundary portion of the unit transparent electrode is removed according to the fine etched pattern, and the adjacent unit transparent electrodes are electrically connected.

Figure 5A:
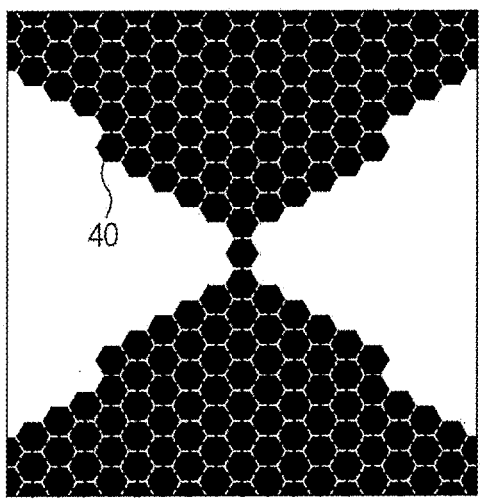
FIG. 5(a), FIG. 5(b), FIG. 5(c) and FIG. 5(d) provide a plan view illustrating one example case in which a unit transparent electrode has a hexagonal shape according to the first embodiment of the present invention.
Figure 5B:
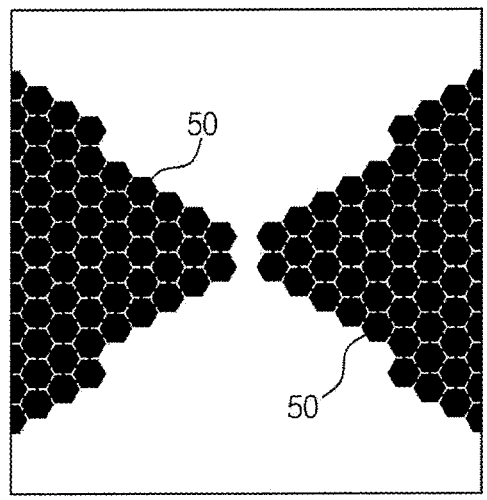
Figure 5C:
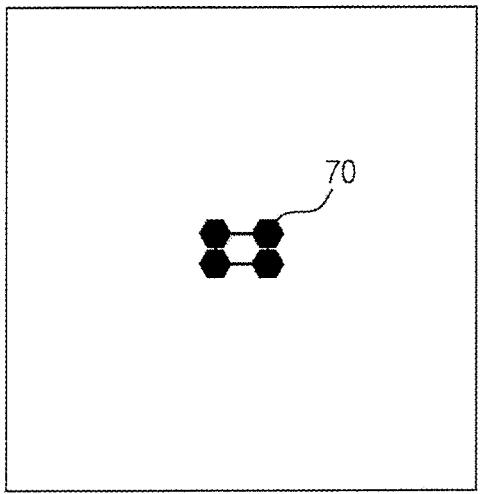
Figure 5D:
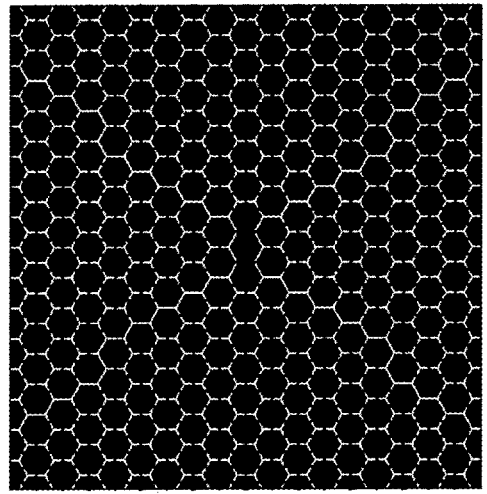

FIG. 5 is the plan view illustrating one example case in which the unit transparent electrode has the hexagonal shape according to the first embodiment of the present invention, FIG. 5A is a plan view illustrating an example of the first detection electrode portion 40, FIG. 5B is a plan view illustrating an example of the second detection electrode portion 50, FIG. 5C is a plan view illustrating an example of the bridge electrode portion 70, and the FIG. 5D is a plan view illustrating an example of the touch sensor after all of the first detection electrode portion 40, the second detection electrode portion 50, and the bridge electrode portion 70 are formed. In FIG. 5, a black portion is the unit transparent electrode, a white portion between the unit transparent electrodes is the fine etched pattern, and the adjacent unit transparent electrodes are electrically connected.

In a state in which the first detection electrode portions 40 are electrically connected, the first detection electrode portions 40 are formed in the first direction, and in a state in which the second detection electrode portions 50 are electrically separated from each other, the second detection electrode portions 50 are formed in the second direction. The second direction intersects the first direction. Here, the directions, which intersect, refer to, for example, directions of two different lines which are not parallel to each other on the same plane. For example, in a case in which the first direction is an X direction, the second direction may be a Y direction. The first detection electrode portion 40 is electrically insulated from the second detection electrode portion 50 by the insulating layer 60 which will be descried below.

For example, in order to reduce a surface resistance, at least one of the first detection electrode portion 40 and the second detection electrode portion 50 may have a multilayered structure, and more specifically, the second detection electrode portion 50 may have a three-layered structure including a metal oxide/metal/metal oxide layer.

The bridge electrode portion 70 electrically connects the adjacent second detection electrode portions 50.

Any transparent conductive material may be used as the first detection electrode portion 40, the second detection electrode portion 50, and the bridge electrode portion 70 without limitation. For example, each of the first detection electrode portion 40, the second detection electrode portion 50, and the bridge electrode portion 70 may be formed of: a metal oxide selected from the group consisting of indium tin oxide (ITO), indium zinc oxide (IZO), indium zinc tin oxide (IZTO), aluminum zinc oxide (AZO), gallium zinc oxide (GZO), fluorine-doped tine oxide (FTO), ITO-silver-ITO (ITO-Ag-ITO), IZO-silver-IZO (IZO-Ag-IZO), IZTO-silver-IZTO (IZTO-Ag-IZTO), and AZO-AZO; a metal selected from the group consisting of gold (Au), silver (Ag), copper (Cu), molybdenum (Mo), and an alloy of Ag, Pd, and Cu (APC); a nanowire of a metal selected from the group consisting of gold, silver, copper, and lead; a carbon-based material selected from the group consisting of a carbon nanotube (CNT) and graphene; and a conductive polymer material selected from the group consisting of poly (3,4-ethylenedioxythiophene, PEDOT) and polyaniline (PANI). A single material or combination of two or more of these materials may be used as the material of the first detection electrode portion 40, the second detection electrode portion 50, and the bridge electrode portion 70, and preferably, the ITO may be used as the material. Crystalline or non-crystalline ITO may be used as the material.

The thicknesses of the first detection electrode portion 40, the second detection electrode portion 50, and the bridge electrode portion 70 are not particularly limited, but it is preferable that the first detection electrode portion 40, the second detection electrode portion 50, and the bridge electrode portion 70 be thin films in consideration of the flexibility of the touch sensor.

The first detection electrode portion 40 and the second detection electrode portion 50 may be referred to as a set of the unit transparent electrodes defined by the plurality of fine etched patterns.

For example, each of the first detection electrode portion 40 and the second detection electrode portion 50 may independently have a pattern having a polygonal shape such as triangular shape, a quadrilateral shape, a pentagonal shape, a hexagonal shape, a heptagonal shape, or more.

In addition, for example, one among the first detection electrode portion 40, the second detection electrode portion 50, and the bridge electrode portion 70 may also be formed in a stripe form.

In addition, for example, each of the first detection electrode portion 40 and the second detection electrode portion 50 may include a regular pattern. The regular pattern refers to a pattern having regularity. For example, each of the detection patterns may independently include a pattern having a mesh shape, such as a rectangular shape or regular quadrilateral shape, or a hexagonal shape.

Any insulating material known in the art may be used as a material of the insulating layer 60 which insulates the first detection electrode portion 40 from the second detection electrode portion 50 without limitation. For example, a metal oxide such as silicon oxide, a photosensitive resin composition containing an acrylic-based resin, or a thermosetting resin composition may be used as the material of the insulating layer 60. In addition, the insulating layer 60 may be formed of an inorganic material such as silicon oxide ($SiO_x$). In this case, the insulating layer 60 may also be formed using a method of deposition, sputtering, or the like.

The element protection layer 80 is formed on the insulating layer 60, on which the bridge electrode portion 70 is formed, to protect and insulate the components of the touch sensor from the outside.

Any insulating material known in the art may be used as a material of the element protection layer 80 without limitation. For example, a metal oxide such as silicon oxide, a photosensitive resin composition containing an acrylic-based resin, or a thermosetting resin composition may be used as a material of the element protection layer 80. In addition, the element protection layer 80 may also be formed of an inorganic material such as silicon oxide (SiO$_x$). In this case, the element protection layer 80 may be formed using a method of deposition, sputtering, or the like.

Figure 11:
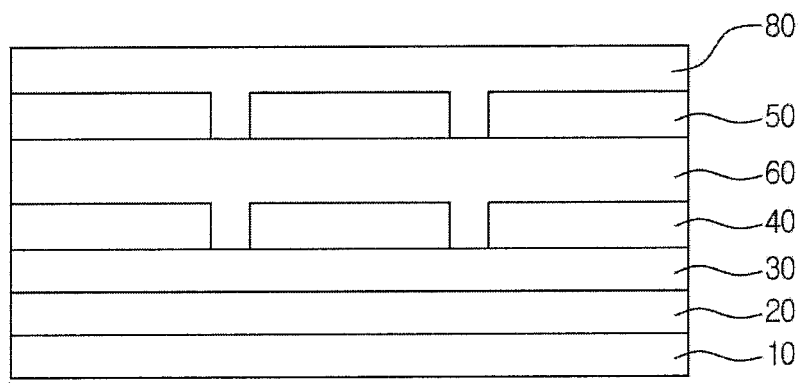
FIG. 11 is a cross-sectional view illustrating an example of a touch sensor according to a second embodiment of the present invention.
Figure 12A:
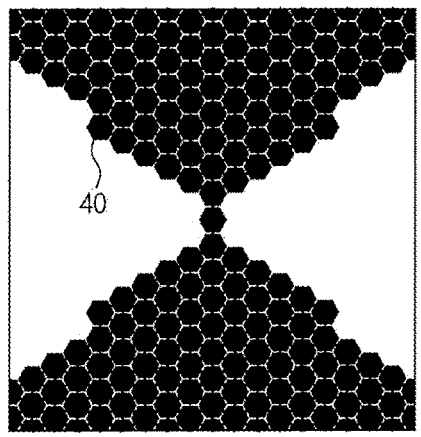
FIG. 12(a), FIG. 12(b) and FIG. 12(c) provide a plan view illustrating one example case in which a unit transparent electrode has a hexagonal shape according to the second embodiment of the present invention.
Figure 12B:
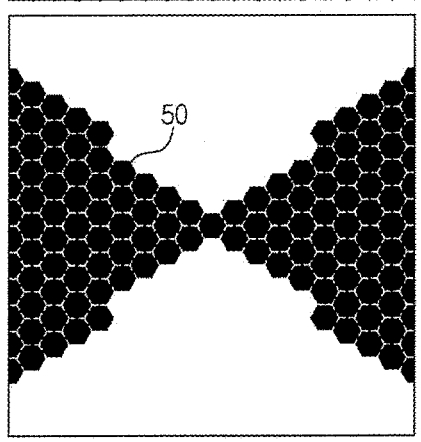
Figure 12C:
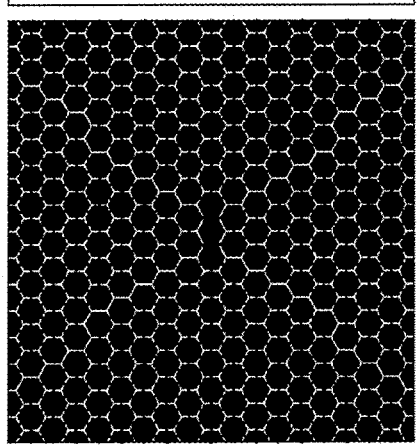

FIG. 11 is a cross-sectional view illustrating a touch sensor according to a second embodiment of the present invention, and FIG. 12 is a plan view illustrating one example case in which a unit transparent electrode has a hexagonal shape according to the second embodiment of the present invention.

Referring to FIGS. 11 and 12, the touch sensor according to the second embodiment of the present invention includes a substrate 10, a first detection electrode portion 40, a second detection electrode portion 50, an insulating layer 60, and an element protection layer 80.

The touch sensor according to the second embodiment of the present invention has a counter electrode structure in which a bridge electrode is not present unlike the above-described touch sensor according to the first embodiment. As will be described below, the counter electrode structure is a structure in which the first detection electrode portion 40 and the second detection electrode portion 50 face each other with the insulating layer 60 interposed therebetween. Hereinafter, the second embodiment will be described focusing on differences between the second embodiment and the first embodiment to avoid redundant descriptions. However, the other descriptions of the first embodiment except for the differences will also be applied to the second embodiment. In addition, although the touch sensor according to the second embodiment will be described based on a structure in which a separating layer 20 and an internal protective layer 30 are omitted, the touch sensor according to the second embodiment may also include the separating layer 20 and the internal protective layer 30 which are the same as those in the touch sensor according to the first embodiment.

First detection electrode portions 40 are formed on the substrate 10 to be connected to each other in a first direction, the insulating layer 60 is formed on the substrate 10 on which the first detection electrode portions 40 are formed, second detection electrode portions 50 are formed on the insulating layer 60 to be connected to each other in a second direction intersecting the first direction, and the element protection layer 80 is formed on the insulating layer 60 on which the second detection electrode portions 50 are formed.

Although some main technical features of the touch sensor according to the second embodiment of the present invention are duplicated with those of the touch sensor according to the first embodiment, the main technical features of the touch sensor according to the second embodiment are that a plurality of fine etched patterns are formed in a boundary portion of a unit transparent electrode included in the first detection electrode portion 40 and the second detection electrode portion 50, a part of the polygonal boundary portion of the unit transparent electrode is removed according to the fine etched pattern, and adjacent unit transparent electrodes are electrically connected.

Referring to FIG. 3 that is referred to in the descriptions of in the problems of the conventional touch sensor, and FIG. 19 which is a graph for describing a principle in which a low frequency component of a spatial frequency generated due to the transparent electrode is converted to a high frequency component which is not visual to a user due to the plurality of fine etched patterns formed in the boundary portion of the unit transparent electrode in the touch sensor according to the embodiments of the present invention, the touch sensor is formed such that the spatial high frequency component is disposed at a front surface of the touch sensor by forming the unit transparent electrode defined by the plurality of fine etched patterns and dividing the first detection electrode portion 40 and the second detection electrode portion 50 in a shape which is the same as that of the fine etched patterns which define the unit transparent electrodes. In other words, the plurality of fine etched patterns formed in the boundary portion of the unit transparent electrode included in the first detection electrode portion 40 and the second detection electrode portion 50 are repeatedly formed in the touch sensor with a predetermined spatial cycle, and the low frequency component of the spatial frequency generated by the first detection electrode portion 40 and the second detection electrode portion 50, each having a pitch which is greater than that of the fine etched pattern, is converted to the high frequency component which is not visual to the user to improve the visibility property of the touch sensor. In addition, since the transmittance of each of the first detection electrode portion 40 and the second detection electrode portion 50 increases due to the plurality of fine etched patterns formed in the boundary portion of the unit transparent electrode, the light transmittance of the entire touch sensor increases. A unit of the spatial frequency of FIG. 19 is cycle per degree (CPD). According to the embodiments of the present invention, it can be seen that a minimum value of the spatial frequency is about 60 CPD or less, and the low frequency component of the spatial frequency generated due to the transparent electrodes is converted to the high frequency component of a minimum 60 CPD which is not visual to the user due to the plurality of fine etched patterns, which is the technical feature of the present invention.

In the touch sensor according to the second embodiment like the first embodiment, the unit transparent electrode defined by the fine etched patterns may have a polygonal shape such as a hexagonal shape, a triangular shape, and a quadrilateral shape in order to maximize a visibility improvement effect. The plurality of unit transparent electrodes may have a tessellation structure. More preferably, the unit transparent electrode may have a regular polygonal shape such as a regular hexagonal shape, a regular triangular shape, and a regular quadrilateral shape. The plurality of unit transparent electrodes may have a regular tessellation structure. The regular tessellation structure has only one regular polygonal shape and has the unit fine etched patterns each having the regular hexagonal shape, the regular triangular shape, or the regular quadrilateral shape.

Figure 14:
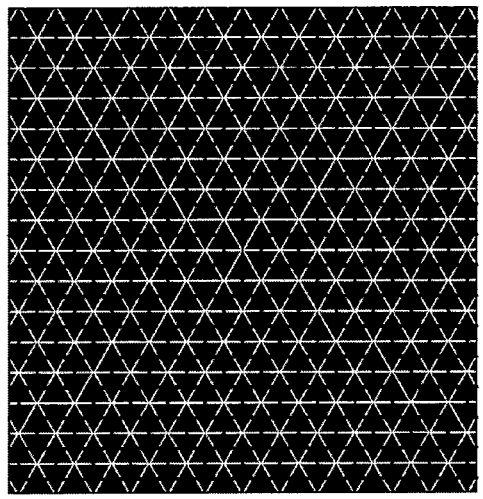
FIG. 14 is a plan view illustrating one example case in which the unit transparent electrode has a triangular shape according to the second embodiment of the present invention.
Figure 16:
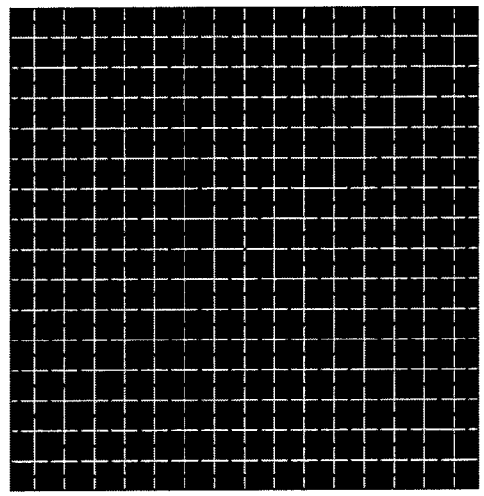
FIG. 16 is a plan view illustrating one example case in which the unit transparent electrode has a quadrilateral shape according to the second embodiment of the present invention.

FIGS. 12(*a*), (*b*) and (*c*) provides views illustrating an example of the regular tessellation structure including the plurality of unit transparent electrodes in the case in which the unit transparent electrode defined by the fine etched patterns has the hexagonal shape in the touch sensor having a counter electrode structure according to the second embodiment, that is, the bridge electrode is not used, FIG. 14 is a view illustrating the regular tessellation structure including the plurality of unit transparent electrodes in the case in which the unit transparent electrode has the triangular shape, and FIG. 16 is a view illustrating the regular tessellation structure including the plurality of unit transparent electrodes in the case in which the unit transparent electrode has the quadrilateral shape.

Figure 13A:
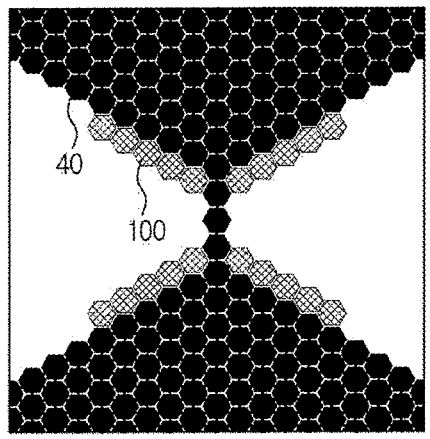
FIG. 13(a), FIG. 13(b) and FIG. 13(c) provide a plan view illustrating another example case in which the unit transparent electrode has the hexagonal shape according to the second embodiment of the present invention.
Figure 13B:
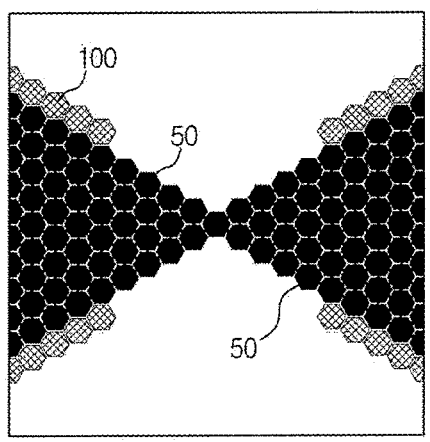
Figure 13C:
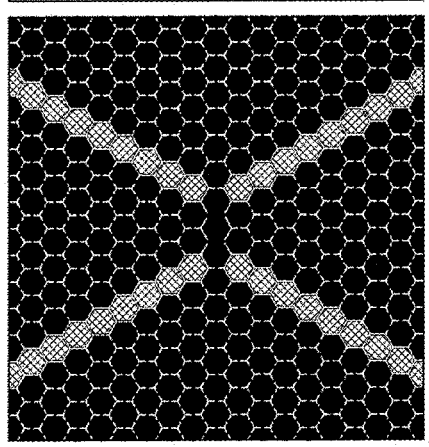

In addition, for example, in a case in which a width of an inter-electrode region which is a gap between the first detection electrode portion 40 and the second detection electrode portion 50 is wide, inter-electrode dummies 100 each having a shape which is the same as that of the unit transparent electrode and electrically insulated from the unit transparent electrode included in the first detection electrode portion 40 and the second detection electrode portion 50 may be additionally formed as illustrated in FIG. 13. As illustrated in FIGS. 13(*a*), (*b*) and (*c*), although the plurality of unit transparent electrodes included in the first detection electrode portion 40 and the second detection electrode portion 50 are electrically connected, the plurality of inter-electrode dummies 100 which are present in the inter-electrode regions between the first detection electrode portion 40 and the second detection electrode portion 50 are not electrically connected. When the plurality of inter-electrode dummies 100 are formed as described above, a plurality of dummy patterns having a spatial frequency which is the same as that of the fine etched patterns are formed in the gap between the first detection electrode portion 40 and the second detection electrode portion 50 to dispose the same high frequency component on the front surface of the touch sensor, and thus a touch sensor pattern cannot be seen due to the same high frequency component disposed on the front surface of the touch sensor.

FIGS. 6(*a*), (*b*), (*c*) and (*d*) provide an example of the regular tessellation structure including the plurality of inter-electrode dummies 100 and the plurality of unit transparent electrodes in the case in which the unit transparent electrode included in the first detection electrode portion 40 and the second detection electrode portion 50 has the hexagonal shape, FIG. 8 shows an example of the regular tessellation structure including the plurality of inter-electrode dummies 100 and the plurality of unit transparent electrodes in the case in which the unit transparent electrode has the triangular shape, and FIG. 10 shows an example of the regular tessellation structure including the plurality of inter-electrode dummies 100 and the plurality of unit transparent electrodes in the case in which the unit transparent electrode has the quadrilateral shape.

Figure 15:
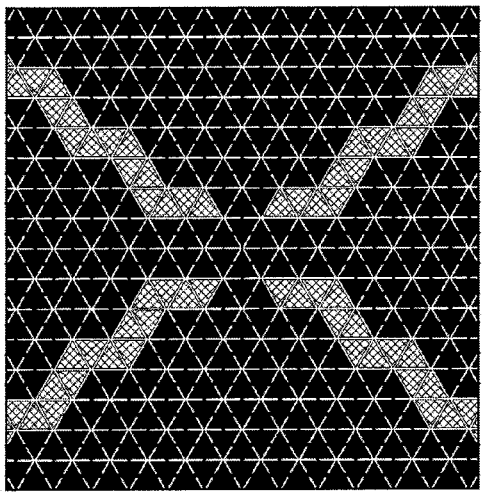
FIG. 15 is a plan view illustrating another example case in which the unit transparent electrode has the triangular shape according to the second embodiment of the present invention.
Figure 17:
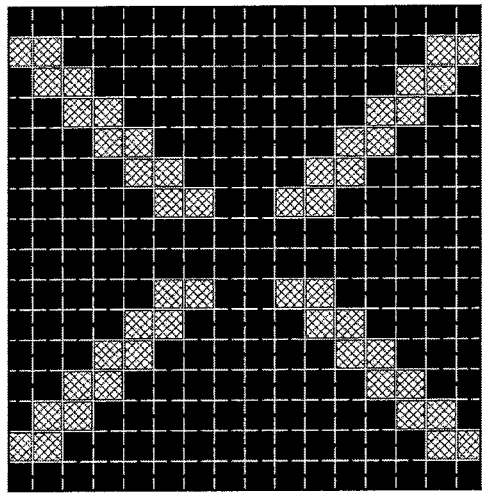
FIG. 17 is a plan view illustrating another example case in which the unit transparent electrode has the quadrilateral shape according to the second embodiment of the present invention.

FIGS. 13(*a*), (*b*) and (*c*) provides views illustrating an example of the regular tessellation structure including the plurality of inter-electrode dummies 100 and the plurality of unit transparent electrodes in the case in which the unit transparent electrode defined by the fine etched patterns has the hexagonal shape in the touch sensor having the counter electrode structure according to the second embodiment, that is, the bridge electrode is not used, FIG. 15 is a view illustrating an example of the regular tessellation structure including the plurality of inter-electrode dummies 100 and the plurality of unit transparent electrodes in the case in which the unit transparent electrode defined by the fine etched patterns has the triangular shape, and FIG. 17 is a view illustrating an example of the regular tessellation structure including the plurality of inter-electrode dummies 100 and the plurality of unit transparent electrodes in the case in which the unit transparent electrode defined by the fine etched patterns has the quadrilateral shape.

As described above in detail, according to the present invention, since the unit transparent electrodes defined by the plurality of fine etched patterns are formed in the transparent electrode, the transparent electrode can be prevented from being unnecessarily visual to the user due to differences between an optical properties of the electrode region in which the transparent electrode is formed and the inter-electrode region in which a transparent electrode is not formed, and the phenomenon in which the light transmittance decreases due to the transparent electrode can also be prevented in order to improve the visibility and light transmittance of the touch sensor.

In addition, since the low frequency component of the spatial frequency generated by the transparent electrodes repeatedly formed in the touch sensor with a predetermined spatial cycle is converted to the high frequency component which is not visual to the user using the unit transparent electrode defined by the plurality of fine etched patterns formed in the transparent electrode, there are effects in that the visibility property of the touch sensor is improved and the light transmittance of the touch sensor is also increased.

REFERENCE NUMERALS

10: substrate
20: separating layer
30: internal protective layer
40: first detection electrode portion
50: second detection electrode portion
60: insulating layer
70: bridge electrode portion
80: element protection layer
100: inter-electrode dummy

The invention claimed is:

1. A touch sensor comprising:
 a first detection electrode portion formed on a substrate in a first direction;
 a second detection electrode portion formed on the substrate in a second direction intersecting the first direction,
 wherein each of the first detection electrode portion and the second detection electrode portion comprise a plurality of unit transparent electrodes each formed by fine etching of the first detection electrode portion and the second detection electrode portion, and
 wherein a plurality of fine etched patterns are formed to define respective boundary portions of each of the plurality of unit transparent electrodes included in the first detection electrode portion and the second detection electrode portion;
 wherein each unit transparent electrode has a polygonal shape formed by a respective boundary portion that was removed by a respective fine etched pattern, and adjacent unit transparent electrodes are electrically connected to each other via the plurality of fine etched patterns;
 wherein a pitch of each unit transparent electrode is in a range of 100 um to 500 um; and
 wherein an inter-electrode dummy portion is formed between the first detection electrode portion and the second detection electrode portion, the inter-electrode dummy portion comprises a plurality of dummy electrodes each formed by fine etching of the first detection electrode portion and the second detection electrode portion, and each dummy electrode having a shape which is the same as that of the unit transparent electrodes, and each of the dummy electrodes being electrically insulated from each of the unit transparent electrodes;
 wherein a plurality of dummy patterns are formed between the first detection electrode portion and the second detection electrode portion, a spatial frequency of the dummy patterns being the same as that of the plurality of fine etched patterns, such that a low frequency component of a spatial frequency generated by the first detection electrode portion and the second detection electrode portion is converted to a high frequency component on a front surface of the touch sensor so that a pattern of the touch sensor is not seen.

2. The touch sensor of claim 1, wherein the plurality of unit transparent electrodes defined by the fine etched patterns have a tessellation structure.

3. The touch sensor of claim 2, wherein the plurality of unit transparent electrodes have one shape selected from among a hexagonal shape, a triangular shape, and a quadrilateral shape.

4. The touch sensor of claim 1, wherein a width of the plurality of fine etched patterns is in a range of 5 pm to 20 pm.

5. The touch sensor of claim 1, wherein a width of a connecting portion which connects the adjacent unit transparent electrodes is in a range of 20 μm to 60 μm.

6. The touch sensor of claim 1, wherein transmittances of the first detection electrode portion and the second detection electrode increase due to the plurality of fine etched patterns.

7. The touch sensor of claim 1, wherein:
  the plurality of unit transparent electrodes are formed by the plurality of fine etched patterns;
  the first detection electrode portion is distinguished from the second detection electrode portion by using the same shape as that of the plurality of fine etched patterns included in the plurality of unit transparent electrodes; and
  a spatial high frequency component is disposed on a front surface of the touch sensor.

8. The touch sensor of claim 1, further comprising a separating layer formed on the substrate.

9. The touch sensor of claim 8, further comprising an internal protective layer formed on the separating layer.

* * * * *